Figure 1:
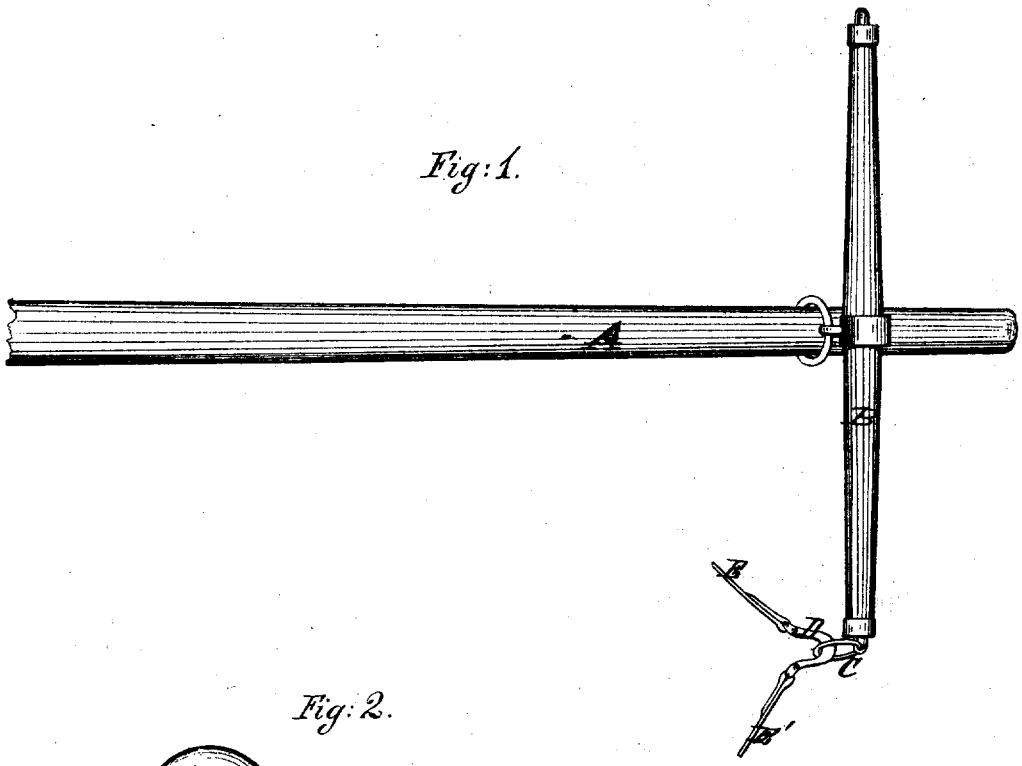
Figure 2:
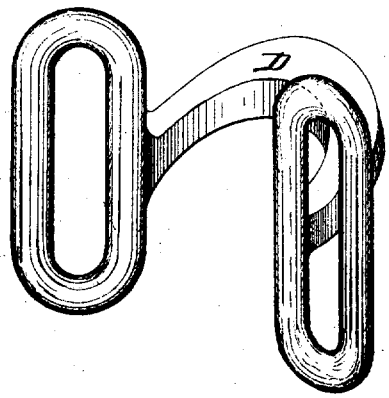

J. Rouse,

Breast Strap.

No. 4,325. Reissued Apr. 4. 1871.

WITNESSES

F. Whiting.

Amer. D. Intire

John Rouse
by Fostnsh & Hyatt
attys.

R. FITTERS, PHOTO-LITHOGRAPHER, WASHINGTON, D. C.

UNITED STATES PATENT OFFICE.

JOHN ROUSE, OF PALMYRA, NEW YORK.

IMPROVEMENT IN HARNESS FOR HORSES.

Specification forming part of Letters Patent No. 25,587, dated September 27, 1859; Reissue No. 4,325, dated April 4, 1871.

*To all whom it may concern:*

Be it known that I, JOHN ROUSE, of Palmyra, in the county of Wayne and State of New York, have invented a certain Improvement in Breast-Straps of Harness, of which the following is a specification.

The nature of my invention consists in the combination, with the breast-strap of harness, of a metallic U-shaped yoke, provided with loops to receive the leathern strap, while the said metallic yoke itself receives the ring of the neck-yoke, and thereby protects the strap from that wear and abrasion which take place when the strap is unprovided with such safeguard.

In the accompanying drawings, Figure I is a plan of a neck-yoke on the end of the pole or tongue of a vehicle, with my improved breast-strap connecting with the ring of the neck-yoke. Fig. II is a perspective view of the U-shaped yoke detached.

Like letters designate like parts in each of the figures.

A is the forward end of a tongue or pole; B, a neck-yoke thereon, and C rings at each end of the neckyoke, through which passes the breast or holdback strap that connects with each side of the hame in the usual manner. D is my new metallic yoke, made of U form, with a loop at each end of sufficient width to permit the insertion of the breast-strap.

In Figure I of the drawings the breast-strap is represented as made in two pieces—one connecting with each loop of the yoke D—instead of being made in one piece and passed through the loops and around the bend of the yoke.

By means of my improvement it is evident that the leathern portion of the breast or holdback strap is fully protected from the abrading action and wear of the ring of the neck-yoke, while the latter is in a measure held against excessive lateral play.

I claim as my invention—

The combination, with the breast-strap of harness, of the U-shaped yoke D, provided with a loop at each end, substantially as hereinbefore set forth.

JOHN ROUSE.

Witnesses:
JAY HYATT,
JOSIAH LETCHWORTH.